Patented Feb. 1, 1938

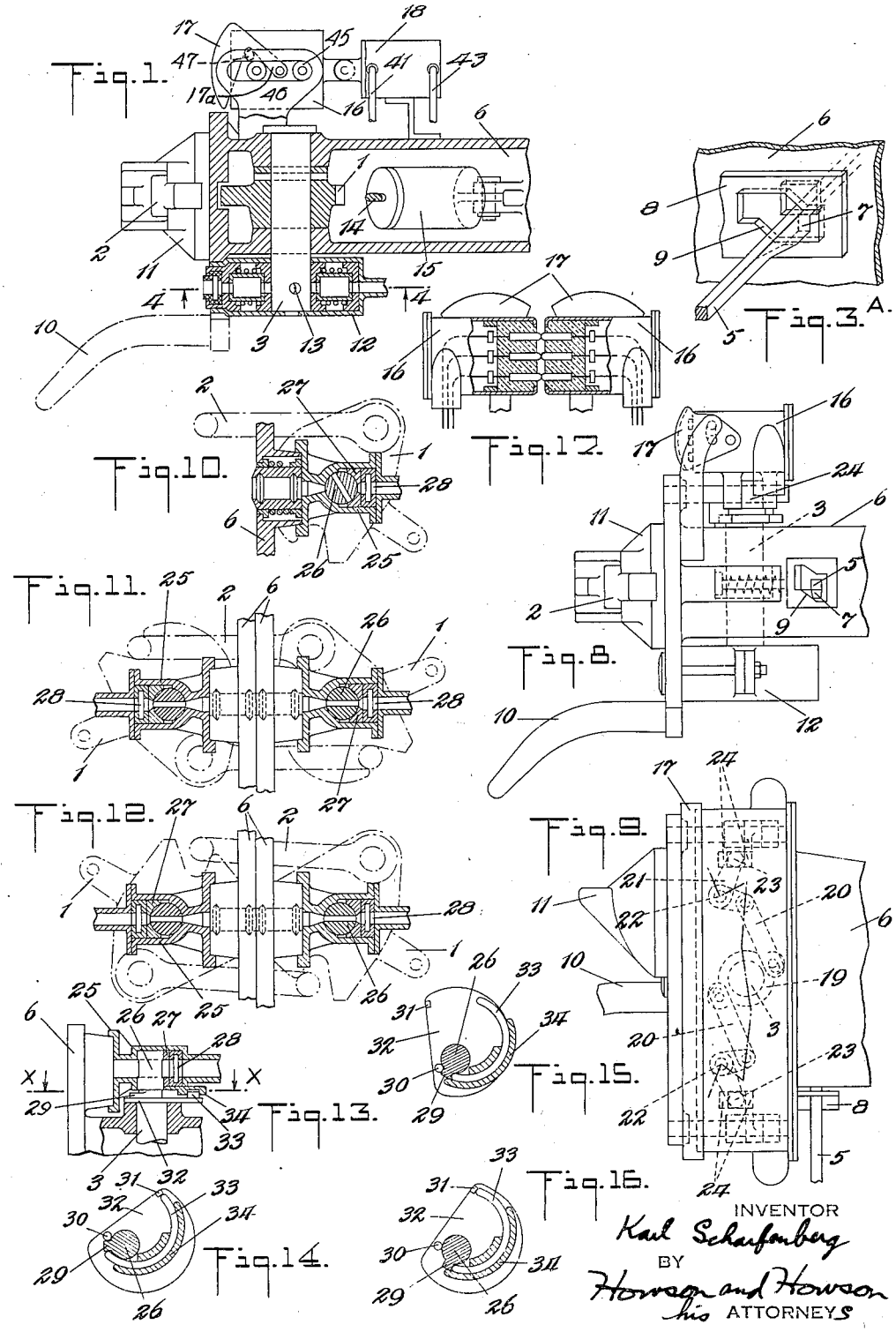

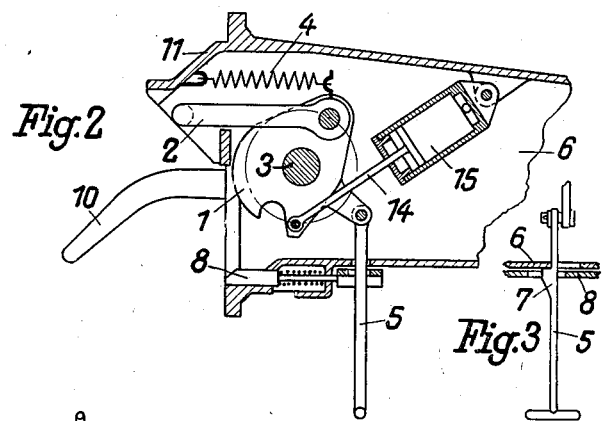
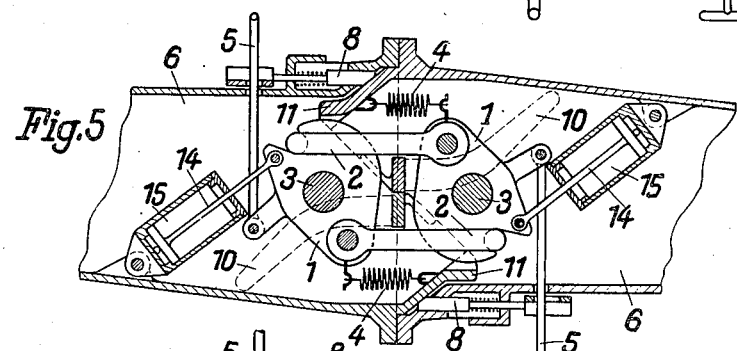
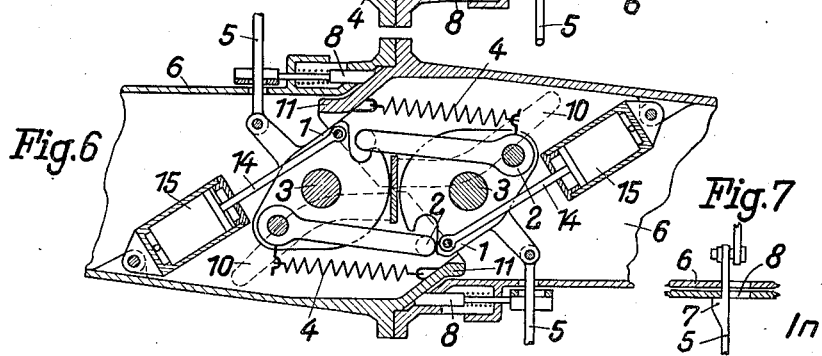

2,107,218

UNITED STATES PATENT OFFICE 2,107,218

AUTOMATIC CAR COUPLER

Karl Scharfenberg, Berlin-Nikolassee, Germany

Application December 26, 1934, Serial No. 759,284
In Germany December 18, 1933

8 Claims. (Cl. 213—95)

The present invention relates to automatic couplings for vehicles. Among the various coupling devices of that type there are such, in which the position of the closing elements of the one coupling head is dependent on the position of the closing elements of the other coupling head, namely in such a manner, that the closing elements of both coupling heads will always execute the same movement during the coupling and releasing operation, in other words they work in a cycle.

With the known constructions of this kind the closing elements are in the case of a released coupling, that is to say while the coupling is not used, in the same position as they are when the coupling is closed. This position is called the regular position.

Now the invention consists in imparting to the closing elements said regular position only while the coupling is closed, but to arrange them in a different position while the coupling is not used. This other position is called the released position.

As a practical example of application for the fundamental inventive idea a coupling is chosen, in which in each coupling head a coupling disc, also called coupling hook, is arranged and adapted to be turned about a bolt. To said coupling disc or hook a coupling eye is pivotally linked, the coupling eye of one coupling head when closed engaging the coupling hook or disc of the other coupling head.

By applying the invention to a coupling of the kind just referred to, the following advantages will accrue:

While with the constructions known up to the present time when the coupling is unused the said coupling eyes protrude from the coupling head and may easily become damaged, these closing elements with the novel construction are situated within the coupling head. Furthermore it is difficult with the known arrangements, to positively connect additional devices such as stop cocks of the air and steam pipes and cable couplings with the mechanical coupling, for while the closing elements of the mechanical coupling—as pointed out above—must be with an unused and closed coupling in the same position, in the regular or fundamental position, the mentioned additional devices, for example the stopcocks for the brakes, must be closed with an unused coupling, but they must be open while the coupling is closed, in other words they are in two different positions.

With the novel arrangement however, a positive connection may be provided as the closed or engaged position of a coupling corresponds with the open position, for instance, of the stopcocks of the air and steam pipes; and the closed position of said cocks will correspond to the released or disengaged position of the coupling.

In the drawings the invention is shown in connection with a suitable coupling.

Figures 1 and 2 show an unused coupling head in a vertical central section and in a horizontal central section through the coupling.

Figure 3 shows the construction and position of the manual pulling device for releasing the unused coupling.

Figure 3—A is a fragmentary perspective view of the means for releasing the manual device.

Figure 4:
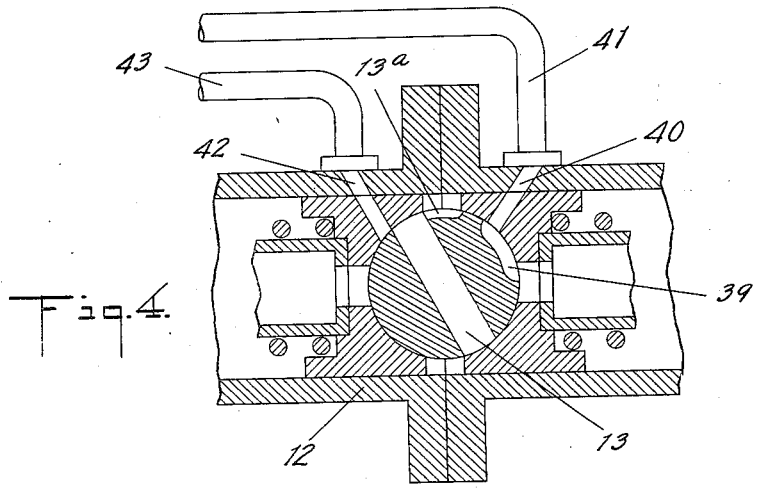
Figure 4A:
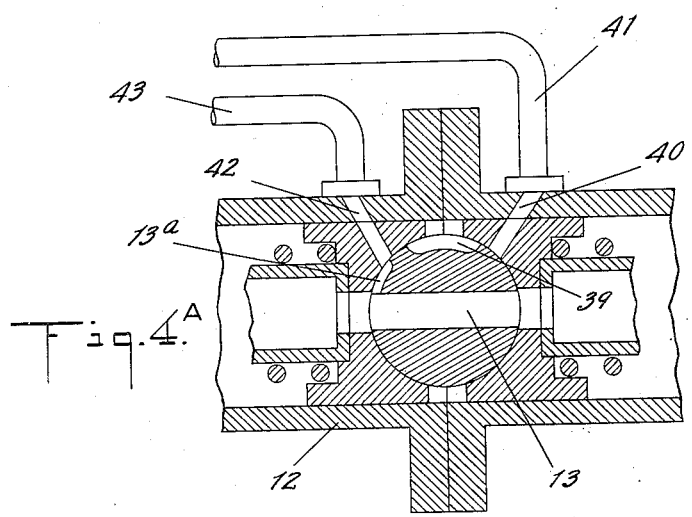

Figure 4 shows a horizontal section through the stopcock of the air pipe with the stopcock in the closed position.

Figure 4—A is a view similar to Fig. 4 with the stopcock in the open position.

Figure 5 illustrates in a horizontal central section a closed coupling, that is to say two coupling heads connected to one another. The closing elements rest in the regular or fundamental position.

Figure 6 is a horizontal central section through a coupling, in which the closing elements have been moved into the released position prior to withdrawing or disengaging the coupling heads.

Figure 7 shows the construction and position of the manual pulling device during the releasing of two closed couplings.

Figures 8 and 9 show in side elevation and plan the coupling head and the direct connection of the electrical cable coupling with the vertical main bolt.

Figures 10 to 16 illustrate a special design of the stopcock for the air pipe and the connection thereof with the main bolt of the coupling closure, by which the advantage is obtained, that at an unintentional opening of the coupling closure the stopcock of the air pipe will remain open, so that the emergency brake will be applied if a portion of the train is separated from said train.

Figure 17 is a fragmentary view, partly in elevation and partly in section of the electrical cable connection.

In the structure shown the mechanical coupling consists of the coupling hook 1 pivotally mounted on a main bolt 3 and having a coupling eye 2 pivoted thereon. A coupling spring 4 tends to rotate the hook 1 to project the eye 2.

By means of the projection 7 on the pulling device 5 the coupling members 1 and 2 may be locked to the casing 6 of the coupling head in the releasing position contrary to the tension of the coupling spring 4. A spring-actuated shifting element 8, which is forced back during the connection or engagement of the two halves of the coupling, will raise by means of an inclined race 9 (see Figure 3—A) in the slide-shaped extension of the shifting device 8, the pulling device 5, so that the lug 7 will be disengaged from the casing 6 of the coupling head. The coupling members 1 and 2 will be moved into the regular or fundamental position through the spring 4, as illustrated in Figure 5. The main bolt 3 is rigidly connected to the coupling hook 1.

As follows from Figure 2 the coupling head is provided on the funnel side of the coupling with a guiding arm 10 in a manner known; besides, the projecting guiding cone 11 serves for the lateral guiding of the coupling heads.

As according to the invention the position of the mechanical closing members with an unused coupling is different from that with a closed coupling, it is possible to connect additional devices directly with the parts of the mechanical coupling. For instance the main bolt 3 has a lower extension and forms the cockplug for the stopcock of the air or steam line 12, that is to say it is provided with a corresponding boring 13 for the passage of the air or steam. With an unused coupling, in which the mechanical parts lie in the released position, the said boring 13 lies transversely to the central axis of the air or steam pipe. With a closed coupling the boring 13 lies in the longitudinal axis of the air pipe, thus this pipe line is opened.

Apart from the releasing device 5 there is also provided an arrangement for releasing the coupling by means of compressed air. A piston rod 14 of the releasing cylinder 15 engages the coupling hook 1. If by means of a releasing valve, which may suitably be arranged in the driver's cabin of the vehicle, compressed air is admitted to the releasing cylinder 15, the couplings are moved from the closed position in Figure 5 to the released position in Figure 6. The pulling device 5, as shown in Figure 7, will engage the lug 7 with the slide-shaped extension of the shifter 8 and the couplings are thus held in the released position, even if compressed air is caused to flow out from the releasing cylinder 15. While the couplings move away from one another the slide-shaped extension of the shifter 8 will slide past the lug 7 and the lug 7 of the pulling device 5 will engage, according to Figure 3, the wall of the casing 6 of the coupling head. According to Figure 2 the coupling members are in the released position and the stopcocks of the air and steam lines respectively remain closed.

Electrical cable couplings may also be operated indirectly or directly with the coupling members in the same manner as the air and steam pipe cocks. If the arrangement is operated by compressed air, as shown in Figure 1, during the release of two couplings compressed air may be supplied indirectly through an auxiliary boring in the stopcock to an air cylinder, which will move the cable couplings into the fundamental or regular position, while at the same time protective flaps will move in front of the cable couplings.

On the other hand, during the movement of the halves of the coupling towards one another and the closing of the mechanical couplings, upon the opening of the air stopcocks compressed air is led to the other side of the piston of the releasing device for the cable coupling and the said cable couplings are advanced into the position for use and the protective flaps above referred to will be turned away from in front of the cable couplings.

In the embodiment shown in Fig. 1, 16 is the cable coupling with the protective flap 17, and 18 is the operating cylinder. The connector casings 16 are mounted on rollers 45 movable in guide slots in the supports 46, and the flaps 17 are supported on arms 17a pivotally connected to the connector casings 16. Pins 47, fixed in the supports 46, engage the arms 17a and raise the flaps 17 as the connectors 16 are pushed forward to engage the connectors and as the connectors are drawn back to inoperative position the movement of the arms 17a of the flap on the pins 47 causes the flaps 17 to be dropped to cover the front of the connector casings 16. When the stopcock 12 is closed, air is supplied from the train pipe through groove 39 and port 40 of the stopcock to pipe 41, Figure 4, which is connected to one end of the operating cylinder 18, Figure 1, and the piston in cylinder 18 is retracted, the cable coupling rendered inoperative, and the flap 17 lowered in front of the cable couplings. When the stopcock 12 is opened air is supplied through a lateral extension 13a of the port 13 of the stopcock, port 42 and pipe 43 to the opposite end of the operating cylinder, operating the piston in cylinder 18 to advance the cable couplings to operative position and raise the flap 17 from in front of the cable couplings. Ports (not shown) permit exhaust of the air from each side of the piston of cylinder 18 as air is supplied to the opposite side.

Figures 8 and 9 illustrate the direct operation of the electrical leads through the coupling and closing members.

A double lever 19 is rigidly secured to the main bolt 3. Said lever acts by way of two rods 20 on two elbow levers 21, turning about fixed pivots 22 on the coupling head 6 and engaging with their outer extremities 23 lugs 24 of the cable coupling 16.

Through the rotation of the main bolt 3 during the coupling operation the double lever 19 together with the rods 20 and elbow-levers 21 will move into the position as shown in the drawings, advancing the cable coupling 16 into the operative position.

The double lever 19 will act here as an angle lever, whereby the cable coupling is insured against being forced back in the fundamental position of the coupling closure.

If, as indicated in the example, the main bolt 3 serves simultaneously as cockplug for the air stopcock, there will be closed simultaneously the stopcock during an unintentional opening of the coupling closure, and during a severing of parts of the train the emergency brake will be actuated only, if the coupling spring will move back and return the coupling closure again to the fundamental position and will open the air stopcock, so that braking air may escape. It is desirable, therefore that during an unintentional opening of the coupling closure the stopcock of the air pipe will remain open and that in this way the emergency brake is actuated with increased reliability if the train is separated. This is effected through a construction and arrangement of the stopcock of the air pipe, as such is illustrated in the modification in Figures 10 to 16.

Figure 10 shows a horizontal section through the central axis of the stopcock of the air pipe while the coupling is released. The coupling closure is in the released position and the stopcock of the air pipe is closed.

Figure 11 shows a horizontal section through the central axis of the stopcock of the air pipe while the couplings are closed. The coupling closures are in the fundamental or regular position and the stopcocks for the air pipe are opened.

Figure 12 shows a horizontal section through the central axis of the stopcock of the air pipe with the coupling closure having been opened unintentionally, the cocks of the air-pipe are open and when parts of the train are separated (when the couplings move from one another) the emergency brake will be applied.

Figure 13 shows the construction of the stopcock, being a vertical section through the central axis.

Figures 14 to 16 are horizontal sections through the stopcock of the air pipe according to line x—x in Figure 13, namely, Figure 14 in the position of the cock according to Figure 10; Figure 15 in the position of the cock according to Figure 11; and Figure 16 in the position of the cock according to Figure 12.

Within the casing 25 of the cock there is the cock-plug 26 arranged rotatably about a vertical axis and the shell 27 of the cock which is forced by means of a rubber ring 28 of U-shaped profile against the cockplug 26. The latter is provided with an extension 29 for operation. The operation of the cock for opening and closing purposes is effected through stops 30, 31 provided on the disc-shaped head 32 of the main bolt 3 and through a crescent-shaped rod 33, guided in the bed-plate 34 of the casing 25 of the cock.

By approaching two cars and closing the coupling closures the cock-plug 26 by means of the extension 29 is moved by the stop 30 on the head 32 of the main bolt 3 from the closed position according to Figure 10 into the open position according to Figure 11 the extension 29 being moved from its position in Figure 14 to its position in Figure 15. The pipes for the braking air are connected ready for use.

If now a severing of the train takes place in that the coupling closures are turned unintentionally, the cockplug 26 will not take part in such rotation, because through the interposition of the crescent 33 a dead turning angle will occur between the stop 31 on the bolt-head 32 and the crescent 33, which corresponds to the angle of rotation of the coupling closure for releasing the coupling. Thus the separation of the train will take place, without closing the cock-plug. The emergency brake will be actuated.

In releasing the coupling by hand or through compressed air respectively, the coupling is operated as in the case of an unintentional release but is turned through a greater angle. In consequence the stop 31 advances the crescent-shaped rod 33 through the additional angle of rotation and operates the lug on extension 29 of the plug 26 on a smaller lever arm than that of the stop 31. The ratio of transmission is so chosen, that the cock-plug 26 is returned from the open position according to Figures 11 and 12 respectively into the closed position according to Figure 10.

In the specification and claims the term "service" when used in such expressions as "a service controlling member", "train service controlling members", "train service controlling means", etc. indicates the train pipe, signal pipe, electrical conductor, and the like equipment.

I claim:

1. An automatic car coupler of the character described comprising coupling elements, a main pin carrying said coupling elements and rotating therewith, said pin having a head on an end thereof, a service controlling member operated in one direction by said head directly and lost motion means for establishing a connection between said head and said member for operation of said member in the opposite direction.

2. In an automatic coupler for vehicles comprising a coupler head, a disk hook rotatably mounted in said head, a coupling link pivotally mounted on said hook, means for holding said coupling link in an inoperative position within said head, means for releasing said holding means upon engagement of said coupler head with a complementary coupler head, means for placing said coupling link in position for coupling upon release of said holding means, train service controlling members and means connecting said train service controlling members and said hook for operating said controlling members to operative and inoperative positions with said coupling link.

3. In an automatic coupler for vehicles comprising a coupler head, a disk hook rotatably mounted in said head, a link pivotally mounted on said hook, means for rotating said hook to withdraw said link to an inoperative position within the coupler head, latching means for holding said hook with said link in the inoperative position, said latching means being operated to release said hook upon engagement of said head with a complementary coupler head, means for rotating said hook to place said link in operative position upon operation of said latching means, train service controlling members and means connecting said train service controlling members and hook for operating said train service controlling members to operative and inoperative positions with said link.

4. In an automatic coupler for vehicles comprising a coupler head, a pin rotatably mounted in said head, a disk hook fixed on said pin, a link pivotally mounted on said hook, means for holding said hook with said link in an inoperative position, said holding means being released upon engagement of said coupler head with a complementary coupler head, means for rotating said hook to place said link in position for coupling upon release of said holding means, train service controlling means and bell crank levers connecting said controlling members and said pin for operating said controlling members to operative and inoperative positions with said link.

5. In combination an automatic car coupler for railway and other vehicles having a disk hook rotating simultaneously with the corresponding part of the complementary coupler during all coupling and uncoupling operations, a pin supporting said disk and rotating therewith, a link carried by said disk for engaging the hook of the complementary coupler, means for holding said link in an inoperative position, means for releasing said holding means by engagement of complementary couplers, means for moving said link to an operative position upon release of said holding means, and service controlling means operated by rotation of said pin.

6. In combination an automatic car coupler for railway and other vehicles having a disk hook rotating simultaneously with the corresponding part of the complementary coupler during all coupling and uncoupling operations, a pin supporting said disk and rotating therewith, a link carried by said disk for engaging the hook of the complementary coupler, means for holding said link in an inoperative position, means for releasing said holding means by an engaging complementary coupler, means for moving said link to an operative position upon release of said holding means, said pin having a portion thereof serving as a service controlling valve.

7. In combination an automatic car coupler for railway and other vehicles having a disk hook rotating simultaneously with the corresponding part of the complementary coupler during all coupling and uncoupling operations, a pin supporting said disk and rotating therewith, a link carried by said disk for engaging the hook of the complementary coupler, means for holding said link in an inoperative position, means for releasing said holding means by an engaging complementary coupler, means for moving said link to an operative position upon release of said holding means, means operated by said pin having a portion thereof serving as a service controlling valve, shell members forming a seat for the valve portion of said means and means holding said shell members against said valve portion.

8. An automatic car coupler comprising a coupling head having a rotatable disk hook, a coupling link in said head, a guide cone on said head, said link being retracted within the limits of the guide cone when the coupling is in disengaged position, means holding said link retracted, means for releasing said holding means by an engaging complementary coupler, and means for advancing said link upon release of said holding means.

KARL SCHARFENBERG.